Sept. 17, 1968    J. S. BORUCKI    3,401,556
EMULSIFIER FOR NON-DESTRUCTIVE TESTING METHODS
Filed Dec. 9, 1964
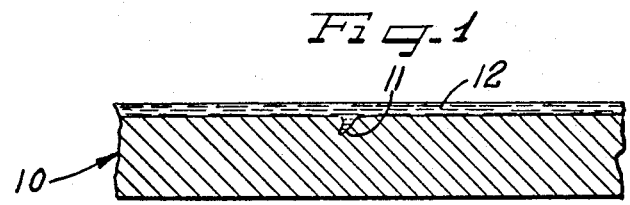
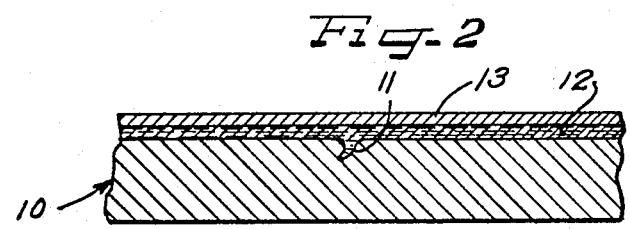
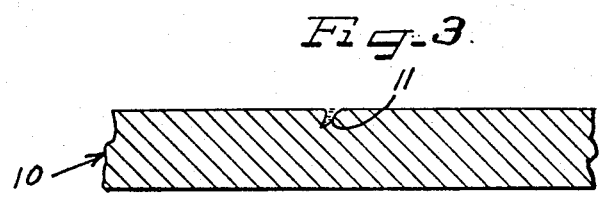
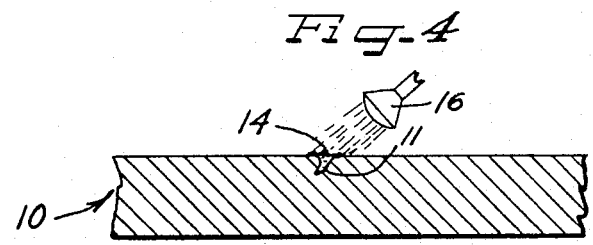
INVENTOR.
James S. Borucki
BY *Hill, Sherman, Meroni, Gross & Simpson* ATTORNEYS

3,401,556
EMULSIFIER FOR NON-DESTRUCTIVE TESTING METHODS
James S. Borucki, Chicago, Ill., assignor to Magnaflux Corporation, Chicago, Ill., a corporation of Delaware
Filed Dec. 9, 1964, Ser. No. 417,079
6 Claims. (Cl. 73—104)

The present invention relates to non-destructive testing procedures, and, more particularly, to a method of detecting surface discontinuities by the so called post-emulsification technique.

The post-emulsification technique involves flooding the surface of the part to be tested with an oily liquid, usually a hydrocarbon oil based penetrant immiscible with water and substantially free of any emulsifying agent. The entire surface of the test piece is thereby coated, and the penetrant is able to lodge within surface discontinuities. Subsequently, the penetrant is washed off with an emulsifying agent by substantially static contact with the penetrant, rendering the latter superficially water-emulsifiable. In the washing with water, only the superficial, emulsified layer of the penetrant is removed, while the unemulsified penetrant remains in any surface flaws. This penetrant, containing a suitable dye or pigment, or the like, then serves to indicate the existence and location of such discontinuities by the contrasting color effect which is obtained upon application to the surface of a developer, either dry or wet. Where the penetrant is contrastingly colored with a visible dye, inspection takes place under "white" light, whereas when a fluorescent dye is dissolved in the penetrant, the inspection is carried out under "black" light.

The post-emulsification system of testing has been widely accepted and practiced on various types of test articles. During the course of such use, however, it has developed that with some penetrants, the efficiency of the emulsifier becomes substantially reduced when the emulsifier is contaminated with even a small amount of the penetrant.

In addition, it was found that some emulsifier compositions could not be used with high nickel content alloys. It developed that such alloys corroded and became brittle at high temperatures, and that this defect was caused by the presence of sulfur, chlorine, and/or phosphorus in the emulsifier composition.

One of the objects of the present invention is to provide an improved emulsifier composition which will successfully emulsify various penetrants, despite a significant amount of contamination of the emulsifier by the penetrant.

Another object of the invention is to provide an improved emulsifier composition for use with sulfur, chlorine, and phosphorus free penetrants, particularly in the testing of high nickel alloys.

Still another object of the invention is to provide a method for removing a hydrocarbon based penetrant from the surface of a test piece by rendering it water washable without adversely affecting the surface of the article.

In accordance with the present invention, I provide a new emulsifier composition which is sulfur, chlorine, and phosphorus free and includes effective proportions of (1) a water miscible alkanol amine (2) tall oil (3) a water miscible polymerized monohydroxy oxy 1,2-propylene aliphatic monoether which functions as a coupling agent (4) a non-ionic lauroyl diethanolamine wetting agent (5) an alkyl aryl polyether alcohol which imparts enhanced water washability to the resulting emulsifier, and is sometimes known as a hydrotrope (6) an isoparaffinic hydrocarbon as a solvent and (7) water. The resulting mixture is non-gelling and exhibits high tolerance toward aromatic type hydrocarbon penetrant contamination.

The following table sets forth the broad and preferred ranges of the ingredients of the composition, as well as a specific example of the same, the percentages being percent by volume:

TABLE I

| | Broad, Percent | Preferred, Percent | Specific, Percent |
|---|---|---|---|
| Alkanolamine | 3–10 | 4–8 | 5 |
| Tall oil | 10–20 | 12–18 | 15 |
| Monohydroxy oxy 1,2 propylene aliphatic monoether | 10–30 | 15–25 | 20 |
| Lauroyl diethanolamine | 15–30 | 20–30 | 25 |
| Hydrotrope | 5–15 | 8–12 | 10 |
| Isoparaffin solvent | 10–30 | 15–25 | 20 |
| Water | Balance | Balance | 5 |

The alkanolamine which can be used is any of the water miscible alkanolamines in which the alkanol portion of the molecule contains no more than about 3 carbon atoms per molecule. A particularly good result is obtained by the use of isopropanolamine, although triethanolamine, diethanolamine, and the like, can be employed but with less satisfactory results.

The tall oil should be a good grade of tall oil of reasonable purity, and which will react with the alkanolamine to form a tall oil soap.

The coupler, which is the water miscible polymerized monohydroxy oxy 1,2-propylene aliphatic monoether is any of a variety of commercially available materials designated by the trade name "Ucon." For the purposes of the present invention, I prefer to use the "Ucon 50HB55" which is a material having a viscosity of approximately 55 S.U.S. (Saybolt Universal seconds) at 100° F. These ethers are random addition polymers produced by condensing ethylene oxide and propylene oxide on a base consisting of an alcohol or a glycol. They are oily liquids which have molecular weights of about 200 to 1000 attributable to the oxyalkylene chain.

The lauroyl diethanolamine is a non-ionic wetting agent which is not affected by hot water. It is produced by the condensation of coconut oil with diethanolamine, and is available commercially under the trade name "Ninol 1281."

The hydrotrope material which imparts enhanced water washability to the emulsifier composition is an alkyl phenyl polyoxyethanol. The preferred hydrotrope is "Triton X100" which is an isooctyl phenyl polyethoxyethanol normally containing between 9 to 10 mols of added ethylene oxide.

The isoparaffinic hydrocarbon is an important constituent of the composition, as it provides substantially greater tolerance for aromatic type hydrocarbon penetrants than does a solvent containing substantially all straight chain hydrocarbons. One particularly effective solvent for the composition of the present invention is that known commercially as "Sole Solve ISP." This solvent has the following properties:

TABLE II

| | |
|---|---|
| A.P.I. gravity | 48–49.5 |
| Initial boiling point ° F | 370–835 |
| 5% over at ° F | 380–395 |
| 50% over at ° F | 420–440 |
| 90% over at ° F | 570–600 |
| Dry point ° F | 625–640 |
| Flash point, by tag closed cup method ° F | 140+ |
| Color | Water–white |
| Specific gravity | 0.7796–0.7883 |
| Sulfur percent | <0.001 |
| Pour point ° F | <−20 |
| Kauri-butanol value | 25.5–26.0 |

A further description of the present invention will be made in conjunction with the attached sheet of drawings in which:

FIGURE 1 is a greatly enlarged cross-sectional view of a test piece having a flaw therein, and coated with a penetrant film;

FIGURE 2 is a view similar to FIGURE 1, but showing the piece after application of the emulsifier composition;

FIGURE 3 is a view of the test piece after removal of the emulsified penetrant by water washing, leaving only the unemulsified penetrant within the discontinuity; and FIGURE 4 is a view illustrating the manner in which the piece is inspected after the application of a suitable indicating powder, under a source of exciting radiation.

In FIGURE 1, reference numeral 10 indicates generally a test piece which may be of any description, metal or non-metallic, ceramic, or the like having a relatively liquid impermeable surface. For the purposes of discussion, we will assume that the test piece 10 is a high nickel alloy which is to be tested for surface flaws. The test piece 10 in FIGURE 1 is shown as including a surface discontinuity 11, the size of which has been substantially enlarged in order to illustrate it more clearly.

After the test piece 10 has been suitably cleaned, the surface thereof is flooded by means of a liquid penetrant, usually containing a hydrocarbon base, in such a manner that the penetrant can completely wet the surface and form a continuous film 12 on the surface to be inspected. For the inspection of high nickel base alloys, it is important that the penetrant also be substantially free from sulfur, phosphorus, and chlorine. The penetrant has the ability to wet the surface and is relatively non-viscous in character, so that it penetrates into the defect 11, to fill the defect with the liquid film.

After the excess of penetrant in the film 12 has been allowed to drain off, the improved liquid emulsifier of the present invention is applied in such a manner as to wet and spread over all of the surfaces to which the penetrant has been applied. The emulsifier may be applied by dipping, pouring, or spraying over the surface, but there should not be sufficient movement or force employed which would tend to disrupt the film 12 of the penetrant by the motion of the emulsifier. The liquid emulsifier forms a film 13 which is in static contact with the underlying film 12 of the penetrating agent. The two films are permitted to stand in contact for a time sufficient to effect emulsification of the penetrant film 12, while being insufficient to effect emulsification of that portion of the penetrant which has become lodged in the defect 11. The exact length of time to be employed can easily be determined by testing on pieces having defects of known dimensions.

After the emulsification period, the surface of the test piece 10 is washed with water to remove the films 13 and 12 while leaving the unemulsified penetrant in the defect 11.

At the completion of the washing operation, the test article has the appearance shown in FIGURE 3, and is then dried to remove any water present. After drying, the piece is dipped into a developer powder consisting of, for example, a dry mixture from 80 to 20 parts by weight of a silica aerogel carrier and from 20 to 80 parts by weight talc or other pigment particles loosely adhering to and carried by the carrier. The developer powder is used to render the portion of the pentrant remaining within the defect 11 more readily visible. If the liquid penetrant is colored by means of a dye dissolved therein, in accordance with usual practice, the color of the penetrant shows up by contrast if a light colored powder is used as a developer. The powder is sufficiently finely divided to act as a wick and cause the liquid penetrant to be drawn up out of the surface defect 11 by capillary action. Thus, the colored penetrant wets and stains the particles of the developer powder 14 that come in contact with the penetrant at the defect. Finally, the non-adhering powder is removed as by means of an air blast, and the pieces inspected. If a visible dye has been used in the penetrant, the piece may be inspected under "white" light, but if a fluorescent dye has been used, it would be inspected under the so called "black" light. A suitable light source is indicated at reference numeral 16 in FIGURE 4.

The viscosity of the liquid emulsion can be varied considerably. When maximum sensitivity is desired only in the case of extremely fine cracks, and the cost of the operation is the major factor, the viscosity of the emulsifying composition can be as low as 20 centistokes. Under other circumstances, highly viscous materials with viscosities up to as high as 1250 centistokes or so at room temperature can be used. The viscosity of the emulsifier should be sufficiently high so that its flow from the part being tested will not be so rapid as to carry penetrant away with it by a purely mechanical or physical action.

The viscosity of the liquid penetrant is not at all critical. It should be viscous enough to stay on the surface to which it is applied, but sufficiently fluid to flow over such surface and drain easily therefrom. A liquid penetrant having a viscosity below about 4 or 5 centistokes will run off too freely, but materials with viscosities as high as 1000 centistokes have been found satisfactory in most cases.

The improved emulsifier composition of the present invention has been found to tolerate greater amounts of aromatic type hydrocarbon based penetrant liquids without losing its effectiveness than emulsifier compositions of the past, despite similarities in their make up. For example, many commercially available emulsifiers cannot tolerate as much as 5% penetrant contamination without greatly reducing their effectiveness, while the composition of the present invention will tolerate on the order of 15 to 20% contamination.

The effectiveness of the emulsifier composition in removing penetrant was tested by a panel wash test in which a film of the penetrant, containing a fluorescent dye, was coated onto a panel, the emulsifier composition was applied over the coated panel, and the resulting emulsified penetrant was removed by washing with either hot or cold water. The panel was then examined under black light for background fluorescence, and the results were evaluated on the basis of a scale from 0 to 10, the rating of 0 constituting a finding of no removal of the penetrant, and a rating of 10 constituting a finding of complete removal of the penetrant. The two compositions tested had the following formulae:

TABLE III

*Emulsifier No. 1*

|  | Percent |
|---|---|
| Mixed isopropanolamines | 7.5 |
| Tall oil | 27.0 |
| "Ucon 50HB55" | 28.0 |
| Water | 1.8 |
| "1012 Paraffin Oil" (predominantly straight chain) | 27.0 |
| "Emcol 5137" (alkanol fatty acid condensate) | 4.5 |
| "Triton X–100" | 4.5 |

*Emulsifier No. 2*

|  | Percent |
|---|---|
| Mixed isopropanolamines | 5.0 |
| Tall oil | 15.0 |
| "Ucon 50HB55" | 20.0 |
| Water | 5.0 |
| "Sole Solve ISP" | 20.0 |
| "Ninol 1281" | 25.0 |
| "Triton X–100" | 10.0 |

A comparison of the results obtained in the panel wash test when using these two emulsifiers, at different degrees of contamination, will be found in the following table:

TABLE IV

| V/V penetrant in emulsifier | Emulsifier No. 1 | | | | Emulsifier No. 2 | | | |
|---|---|---|---|---|---|---|---|---|
| | Penetrant No. 1 | | Penetrant No. 2 | | Penetrant No. 1 | | Penetrant No. 2 | |
| | Hot | Cold | Hot | Cold | Hot | Cold | Hot | Cold |
| 0 | 10 | 8 | 9 | 9 | 10 | 10 | 10 | 10 |
| 2 | 8 | 8 | 7 | 7 | 10 | 10 | 10 | 10 |
| 4 | 7 | 8 | 6 | 6 | 10 | 10 | 10 | 10 |
| 6 | 6 | 7 | 5 | 5 | 10 | 10 | 10 | 10 |
| 8 | 5 | 6 | 4 | 4 | 10 | 10 | 10 | 10 |
| 10 | 5 | 4 | 4 | 4 | 10 | 10 | 10 | 10 |
| 12 | 4 | 3 | 3 | 3 | 10 | 10 | 10 | 9 |
| 14 | 4 | 1 | 1 | 1 | 10 | 9 | 9 | 8 |
| 16 | 3 | 1 | 1 | 1 | 8 | 9 | 7 | 7 |
| 17 | 3 | 1 | 1 | 1 | 7 | 6 | 7 | 6 |
| 18 | 1 | 1 | 1 | 1 | 6 | 6 | 6 | 6 |
| 19 | 1 | 1 | 1 | 1 | 5 | 5 | 6 | 5 |
| 20 | 1 | 1 | 1 | 1 | 5 | 5 | 5 | 5 |
| 25 | 1 | 1 | 1 | 1 | 1 | 1 | 3 | 1 |
| 30 | 1 | 1 | 1 | 1 | 1 | 1 | 2 | 1 |

The foregoing table clearly shows that the emulsifier of the present invention, emulsifier No. 2, is considerably more effective at various levels of penetrant contamination than emulsifier compositions which have been used for this purpose in the past. Furthermore, due to the absence of phosphorus, chlorine, and sulfur in the emulsifier composition, there is no corrosion or embrittlement of high nickel alloys resulting from the use of the emulsifier compositions of this invention.

It should be evident that various modifications can be made to the described embodiments without departing from the scope of the present invention.

I claim as my invention:

1. An aqueous emulsifier composition free from sulfur, chlorine and phosphorus consisting essentially of the following ingredients and the proportions by volume:
   3 to 10% of a water-immiscible $C_1$–$C_3$ alkanolamine;
   10 to 20% of a tall oil in a state reactable with said alkanolamine to form a soap;
   10 to 30% of a water-miscible polymerized monohydroxy oxy 1,2-propylene aliphatic monoether having a molecular weight between about 200 and 1,000;
   15 to 30% of lauroyl diethanolamine;
   5 to 15% of alkyl aryl polyethoxyethanol containing about 9 to 10 ethylene oxide groups per molecule;
   10 to 30% of an isoparaffinic hydrocarbon solvent, and the balance water;
   the aforenamed ingredients being in such proportions that the resulting composition is non-gelling and exhibits high tolerance toward aromatic hydrocarbon penetrant contamination.

2. A composition as defined by claim 1, wherein said ingredients are in the following proportions by volume:
   4 to 8% of said alkanolamine,
   12 to 18% of said tall oil,
   15 to 25% of said mono ether,
   20 to 30% of said lauroyl diethanolamine,
   8 to 12% of said alkyl aryl polyethoxyethanol,
   15 to 25% of said isoparaffinic hydrocarbon solvent, the balance water.

3. A composition as defined by claim 1, wherein said alkyl aryl polyethoxyethanol is octyl phenoxy polyethoxyethanol.

4. A composition as defined by claim 1, wherein said alkanolamine is isopropanolamine.

5. In a non-destructive method of testing a high nickel bearing alloy for surface discontinuities by the application to the surface of said alloy of an oily water-immiscible penetrant, the step of applying over any of said penetrant remaining on said surface an emulsifier composition as defined by claim 1.

6. In a non-destructive method of testing a high nickel bearing alloy for surface discontinuities by the application to the surface of said alloy of an oily water-immiscible penetrant, the step of applying over any of said penetrant remaining on said surface an emulsifier composition as defined by claim 1.

References Cited

UNITED STATES PATENTS

| 1,930,845 | 10/1933 | Ulrich et al. | 252—356 |
| 2,398,295 | 4/1946 | Epstein et al. | 252—357 |
| 2,677,700 | 5/1954 | Jackson et al. | 252—356 |
| 2,806,959 | 9/1957 | De Forest et al. | 73—104 |
| 2,953,530 | 9/1960 | Switzer | 73—104 X |
| 3,028,338 | 4/1962 | Parker | 73—104 |
| 3,069,361 | 12/1962 | Cogswell | 252—356 |

RICHARD C. QUEISSER, *Primary Examiner.*

C. I. McCLELLAND, *Assistant Examiner.*